Aug. 5, 1969 K. D. JACOB 3,460,040
SINGLE FREQUENCY COMMUNICATION REPEATER
Filed Aug. 2, 1967
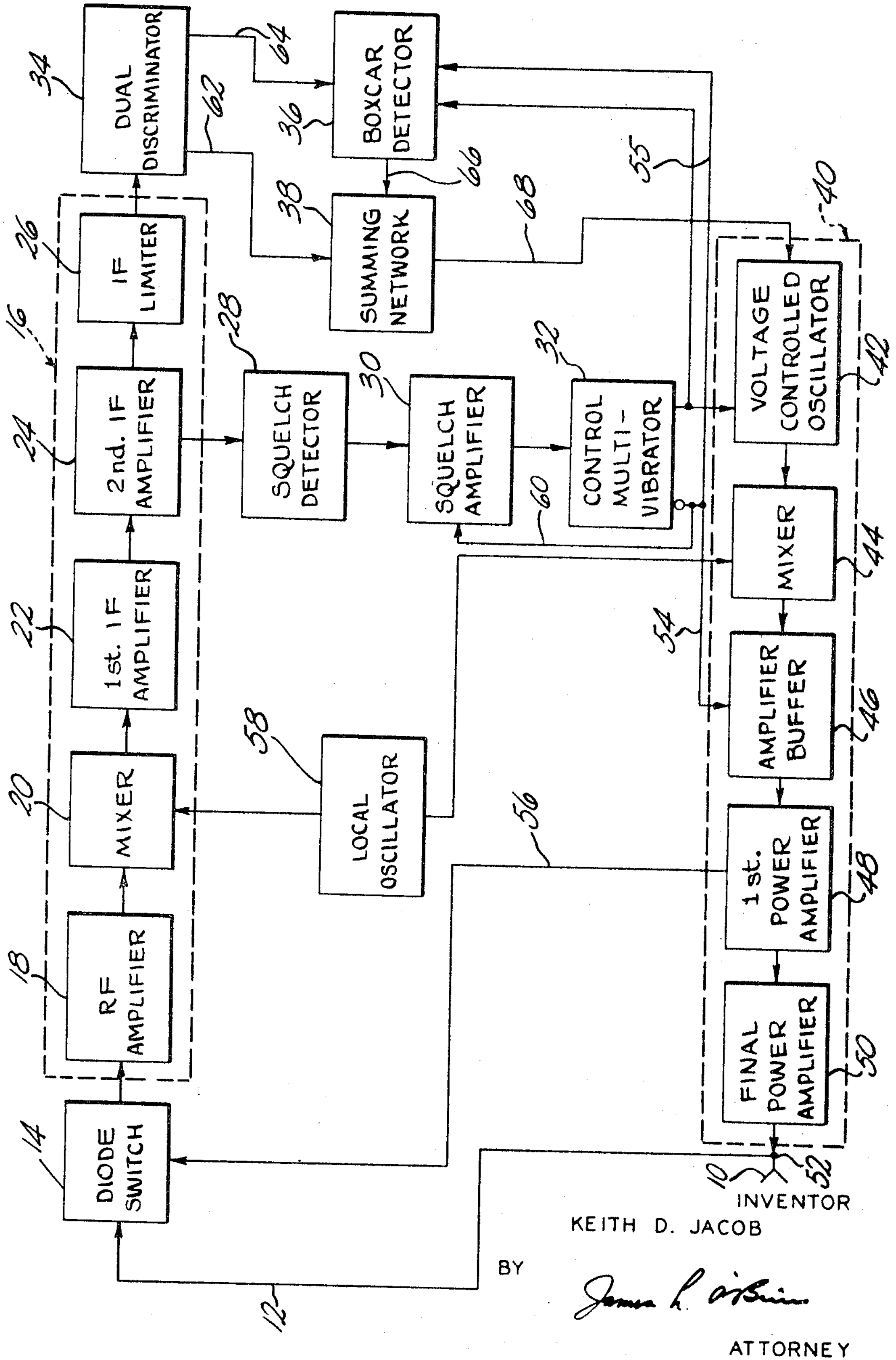
INVENTOR
KEITH D. JACOB
BY
ATTORNEY 3,460,040

SINGLE FREQUENCY COMMUNICATION REPEATER

Keith D. Jacob, Ann Arbor, Mich., assignor to The Bendix Corporation, a corporation of Delaware Continuation of application Ser. No. 397,993, Sept. 21, 1964. This application Aug. 2, 1967, Ser. No. 657,894
Int. Cl. H04b 7/14
U.S. Cl. 325—6 14 Claims

ABSTRACT OF THE DISCLOSURE

A radio frequency repeater that receives and transmits at a single variable frequency on a time sharing basis in which the repeater is switched between receive and transmit at higher than audio frequency whenever the received signal is above a predetermined threshold value, and including a device to attenuate the signal to the receiver when the transmitter is active, and including a time delay circuit for comparing the received signal of one interval with the signal being generated during the next interval to thereby control the transmitted signal to maintain it substantially the same frequency as that of the received signal.

Cross references to related applications

This application is a continuation of application Ser. No. 397,993, filed Sept. 21, 1964, now abandoned.

BACKGROUND OF THE INVENTION

Field of invention

This invention relates to FM communication signal repeating stations which transmit and receive alternately using a common frequency on a time sharing rate that is higher than the audio range.

Description of prior art

U.S. Patents 2,425,315; 2,489,273; 2,561,363; 2,704,-323; 2,706,244; and 3,183,441, which are of record in the parent case, are illustrative of electronic systems with receiving and transmitting. However, these patents do not disclose the repeater of the present invention wherein a time sharing between the receiver and the transmitter at greater than audio frequency rate is accomplished so that the human ear hearing the transmitted signal at the ultimate receiver will be unaware that the transmitter has been switched on and off. The transmitted signal is fed back into the receiver for comparison with the received frequency to provide a frequency difference signal to control the frequency of the transmitter so that its frequency on its time interval is substantially identical with that frequency of the signal received during the previous time interval.

SUMMARY

The present case is a frequency modulated signal repeater using a common frequency in which a multivibrator switches the circuit from transmit to receive and back again at greater than audio frequency rate any time the received signal is above a predetermined threshold value. The transmitter and receiver use a common antenna with a high impedance automatically placed in the receiving circuit when the transmitter is in operation to control the amplitude of the transmitter signal fed back into the receiver. The circuit has means for comparing the transmitter signal on one interval to that of the received signal during the previous interval and correcting the frequency of the transmitter so that the transmitted signal frequency is essentially identical with the frequency received during the previous time interval. The control multivibrator which is the switching means also switches other parts of the circuit so that the transmitted signal which is being fed back through the receiver circuit to obtain a comparison signal is not confused with the true received signal and thereby energizing the multivibrator. The circuit has a time delay or storage network so that the received signal and transmitted signal can be compared and thus control the frequency generated by the transmitter oscillator.

It is thus an object of this invention to provide a frequency modulated repeater that will permit a greater range of transmission without modification of either the basic transmitter or the ultimate receiver.

Certain communication systems are frequency modulated frequencies that are in the spectrum that have substantially line of sight transmission. For this reason the range of communication is not only limited by transmission power and receiver sensitivity, but also limited by the distance of the line of sight between the transmitter and receiver antenna. In military operations on rough terrain this seriously limits effective communications.

It is therefore an object of the present invention to provide a repeater that may be placed at an elevated position between the transmitter and receiver so that the signal may be transmitted from the transmitter to the repeater and the signal ampliged and transmitted from the repeater to the ultimate receiver so that communication range may be extended without modification of either the original transmitter or the ultimate receiver.

BRIEF DESCRIPTION OF THE DRAWING

Referring now to the drawing, the numeral 10 designates a nondirectional antenna used for both transmission and receiving connected through a quarter wave length line 12 to a diode switch 14. This diode switch has a low impedance when no signal is impressed upon it through line 56 and a high impedance when a signal is impressed upon it through line 56. The diode switch 14 is connected to an FM receiver shown generally as 16, including an RF amplifier 18, a mixer 20, a first IF amplifier 22, a second IF amplifier 24 and an IF limiter 26 all of standard design. The output of the IF limiter 26 is fed into a dual discriminator 34 which produces two low frequency signals identical but of opposite polarity and proportional to the IF signal frequency deviation.

These two signals are fed through lines 62 and 64 to summing network 38 and boxcar detector storage circuit 36 respectively. The boxcar circuit 36 switches to its output only the energy received during the received half of the cycle. This energy is stored by a capacitor (not shown) at the boxcar output thus causing a signal proportional to the deviation present during the receive half period to be delayed and presented during the transmit half period. This signal is added in magnitude and direction to the output of the negative discriminator channel. During the transmitter half cycle to the resultant signal is then an error signal proportional to the frequency difference between received and transmitted signals. When applied to the voltage controlled oscillator the audio and DC components of this error signal cause it to be frequency modulated in accordance with the received signal modulation and cause its center frequency to agree with that of the received signal, during the transmit half cycle. Since the voltage controlled oscillator is gated off during the receive half cycle, error signals during this time are of no consequence. The transmitter 40 includes, in addition to the voltage control oscillator 42, a mixer 44, a buffer amplifier 46, a first power amplifier 48 and a final power amplifier 50 connected to the antenna 10 at one end 52 of the quarter wave length time 12. The mixer 20 of the receiver 16 and the mixer 44 of the transmitter 40 both obtain a control signal from a common local oscillator 58. The time sharing multivibrator 32 is placed in operation whenever a signal above a predetermined threshold value is impressed upon it for a predetermined time through squelch detector 28 and squelch amplifier 30 from the second IF amplifier 24 of the receiver.

When a signal above threshold value is received by the antenna 10 and transmitted through diode switch 14 and RF amplifier 18, mixer 20, IF amplifier 22, IF amplifier 24, squelch detector 28 and squelch amplifier 30 to the multivibrator 32, the multivibrator 32 switches the oscillator 42 on and off at a frequency above the audio range. When it switches on the oscillator 42, the multivibrator 32 also switches the boxcar detector 36 so as to feed the previously received signal over to the summing network 38 through line 66 and switches off the detector 36 so it will not receive a signal from the dual discriminator 34 through the line 64. Simultaneously, the multivibrator 32 turns on the buffer amplifier 46 and turns off the squelch amplifier 30. It turns off the squelch amplifier 30 so that the transmitted signal which is fed back to the receiver will not be used as a threshold signal to keep the multivibrator in operation.

The signal from the first power amplifier 48 is fed through the line 56 to the diode switch 14 to make it a very low impedance. This short circuit causes the ¼-wavelength line to present a high impedance to the transmitter 40 at the antenna terminal. The net effect is that the transmitted signal is greatly attenuated before going into the receiver 16 but the transmitter is not loaded by the short. The attenuated transmitter signal generates a signal through the dual discriminator 34 which is fed down through the line 62 to the summing network 38 for comparison with the received signal from the previous interval to produce a signal for controlling the frequency of the oscillator 42.

DESCRIPTION OF PREFERRED EMBODIMENT

In the preferred embodiment of the present invention the repeater is an FM repeater in which the received signal is used to control the frequency of the transmitted signal so that the receiver and transmitter are on during alternate time periods which time periods occur at higher than audio frequency. The transmitted frequency on one time interval is controlled to be identical with the frequency of the received signal on the previous time interval. As the frequency of the received signal varies from time interval to time interval the frequency of the transmitted signal will vary from time interval to time interval with the frequency of the transmitted signal on a particular time interval being identical to that of the received signal on the previous time interval. The human ear hearing the signal at the ultimate receiver will be unaware that the received signal has been switched on and off at greater than audio range. Therefore the ultimate receiver will receive a frequency modulated signal which although pulsed, will come through the audio part of the receiver as an audio signal which sounds to the listener identical to the one which was used to modulate the carrier signal in the original transmitter.

The repeater is normally placed in the receive standby position. A frequency modulated signal is received by the antenna 10 and fed through the line 12 and diode switch 14 to the receiver 16. The frequency modulated signal is fed through amplifier 18 to the mixer 20 where it is combined with the fixed frequency signal from the local oscillator 58 to produce an IF signal which is fed through the IF amplifiers 22 and 24 both to the IF limiter 26, and to squelch detector 28. The signal from limiter 26 is fed into the dual discriminator 34, which produces DC signals on the lines 62 and 64 which are each proportional to frequency deviation of the IF signal and opposite to each other in polarity. The signal from 62 is fed into the summing network 38 and the signal 64 of opposite polarity is fed into the boxcar detector signal storage circuit 36 to be compared in the network 38 with the signal that will be introduced through the line 62 by the subsequent transmitted signal.

The signal that is fed into the squelch detector 28 by the IF amplifier 24 is amplified by the squelch amplifier 30 and fed into the control multivibrator 32. When this signal is above a predetermined threshold value and impressed on the control multivibrator for a predetermined length of time the multivibrator switches over to unblock, through conductor 54, the buffer amplifier 46 so that a signal may be fed into the first power amplifier 48 and at the same time the multivibrator 32 feeds a signal back through conductor 60 to block the squelch amplifier 30. Simultaneously, multivibrator 32 feeds a signal through conductor 55 to block the boxcar detector 36 so that a signal will not be fed from the dual discriminator 34 to the boxcar detector 36. Simultaneously a gating control voltage is fed to the voltage controlled oscillator 42 to place it in operation and to the boxcar detector 36 to permit passage of the comparison voltage which was generated during the previous receive cycle. The signal being generated by the transmitter will then be compared with the signal generated by the previous signal in the summing network 38 to produce a control voltage for oscillator 42 so that the signal generated by 42 is identical in frequency to the frequency of the signal received during the previous interval. The signal generated by oscillator 42 is then fed from the amplifier 46 to power amplifier 48.

A control signal is then transmitted by means of line 56 to the diode switch 14. This signal on the diode switch 14 makes the switch have a very high impedance path between the line 12 and the RF amplifier 18. The transmitted signal passes to the final power amplifier 50 where it is then fed out onto the antenna 10 through the terminal 52. The quarter wave length line 12 is also of high impedance so that a small fraction of the transmitter signal that is fed through the terminal 52 gets through the line 12 and the diode switch 14 to the receiver 16. This small signal is passed through the receiver in much the same manner as the received signal from the previous interval. However, the output of the squelch detector 28 is blocked at the squelch amplifier 30 and has no effect on the control multivibrator 32.

The output of the IF limiter 26 is fed into dual discriminator 34 and again two signals of equal strength, of opposite polarity and of magnitude proportional to the frequency deviation from the mean frequency of the transmitted signal which has come through the receiver, are fed to the lines 62 and 64 respectively. Therefore, a DC signal proportional to the deviation of the frequency from the mean carrier is fed to the summing network 38 through 62. The opposite polarity signal which is on the line 64 is blocked from affecting the boxcar detector 36 and the signal that was generated by the previous received signal is fed through the line 66 to the summing network 38 where the frequency of the transmitted signal as represented by one voltage is compared with the frequency of the received signal during the previous interval as represented by a second voltage. A signal proportional to the difference in magnitude of these two signals is fed through line 68 to produce a frequency control signal for voltage controlled oscillator 42.

The frequency generated by this oscillator 42 is thereby controlled so it is identical to the frequency of the signal received on the previous interval. In this way the oscillator 42 is adjusted so that as the frequency of the received signal varies from interval to interval, the frequency of the transmitted signal varies from succeeding interval to succeeding interval so that the frequency of the received signal and the frequency of the signal transmitted on the following interval is maintained substantially identical.

As mentioned above, the squelch amplifier 30 is blocked during the transmit cycle and therefore the control multivibrator after a time interval drops back over to the receive cycle and this opens the circuit through the squelch amplifier and turns off the transmitter which unblocks the diode 14 and the receiver is again in a position to receive a signal from the antenna 10 and the cycle of operation starts all over again. As soon as this received signal has again been received for a predetermined length of time, a voltage as described above is again built up on the control multivibrator to flop it into the transmitting stage where it remains for a predetermined length of time until it flops back over to the receiving stage. This flopping of the multivibrator from transmit to receive is at a frequency above the audible range so that even though the repeater is receiving and transmitting on alternate intervals of time, these alternate intervals are so closely spaced together that the human ear cannot hear the change from receive to transmit and the ultimate receiver receives a signal much as it does without the repeater except that it is receiving an interrupted signal. The use of a repeater having such a time cycling on a single frequency makes it possible to use the presently utilized transmitters and receivers without modification and extend the range thereof many fold. The communication repeater of the present invention is particularly useful in extending the range of line of sight transmitters and may be left unattended with a relatively low power consumption during standby operation and yet automatically and reliably respond to a transmitted signal. No change need be made in existing equipment in order to use the repeater of the present invention.

Although only one embodiment of my invention has been described, it will be readily apparent to those skilled in the art that various changes and modifications may be made without departing from the scope of this invention.

I claim:

1. A single frequency electric signal communication repeater including a signal transmitter, a signal receiver, an antenna common to both said transmitter and said receiver, a variable electric signal attenuation means interposed between said antenna and said receiver, said attenuation means being connected to and controlled thereby so as to have high attenuation characteristics when said transmitter is on and low attenuation characteristics when said transmitter is off, and a time sharing switching device for switching said receiver and said transmitter alternately on at intervals which occur at a rate higher than audible frequency.

2. A communication repeater as in claim 1 further including means responsive to the frequency of the signal received by said receiver during one interval to control the frequency of the signal transmitted by said transmitter during the succeeding interval.

3. A communication repeater as in claim 2 in which the time sharing switching device is operative only when the strength of the signal being received by said signal receiver is above a predetermined threshold value.

4. A communication repeater as in claim 3 further including means controlled by said time sharing switching device to make said device unresponsive to a signal received from said signal receiver when said transmitter is transmitting.

5. A communication repeater as in claim 4 further including a fixed frequency signal source, mixer circuits in both said receiver and said transmitter, and means connecting said fixed frequency signal source to said mixer circuits so as to control the output of said mixer circuits in a fixed frequency relationship.

6. A communication repeater as in claim 1 further including a voltage controlled oscillator the control voltage for which is proportional to the difference between the frequency of the received signal on one time interval and the transmitted frequency on a succeeding time interval for controlling the transmitter frequency.

7. A communication repeater as in claim 2 further including a conductor connected between said receiver, said transmitter, and said antenna, said conductor being of a length equal to an integer of quarter wave lengths of the mean frequency being transmitted.

8. A communication repeater as in claim 1 in which said attenuation means interposed between the antenna and the receiver is a diode switch responsive to a voltage from the transmitter.

9. A communication repeater as claimed in claim 2 in which the means responsive to the frequency received includes a dual discriminator circuit for producing two signals of opposite polarity equal to each other and proportional to the frequency deviation from a predetermined mean frequency, a storage circuit capable of storing one of said signals for a time interval and a summing network circuit capable of comparing the signal stored for a time interval with the other signal being generated by the dual discriminator to produce the frequency control voltage for said transmitter.

10. A communication repeater as claimed in claim 2 further including means for feeding back to the receiver from the antenna a portion of the transmitted signal and means for comparing the frequency of said transmitted signal with the frequency of the signal received during the previous receiving interval for controlling the frequency of the transmitter.

11. A communication repeater comprising: a receiver, a transmitter, a common antenna for said receiver and transmitter, a gating means energized by the presence of a predetermined signal in said receiver for switching said transmitter on and off at a predetermined rate, said receiver being adapted to receive a signal from said transmitter when said transmitter is on, discriminator means connected to said receiver for providing first and second signal outputs of opposite polarity and related in amplitude to the frequency of the receiver output signal, signal storage means adapted to be connected to the first signal output of said discriminator means, a summing network connected to the second signal output of said discriminator means, means controlled by said gating means to connect said storage means to said discriminator means when said transmitter is off and to connect said storage means to said summing network when said transmitter is on, a variable frequency signal source connected to said summing network and having an output the frequency of which is a function of the output from said summing network, and means for connecting variable signal sources to the input of said transmitter.

12. The communication repeater of claim 11 wherein means are provided to render said gating means insensitive to the output of said transmitter.

13. The communication repeater of claim 11 wherein means energized when said transmitter is turned on are provided for increasing the impedance between said receiver and said antenna to thereby protect said receiver when said transmitter is on.

14. A single frequency electric signal communication repeater including a signal transmitter, a signal receiver, antenna means operatively associated with said transmitter and receiver for transmitting and receiving a signal, a variable electric signal attenuation means interposed between said antenna means and said receiver, said attenuation means being connected to and controlled thereby so as to have high attenuation characteristics when said transmitter is off, and a time sharing switching said receiver and said transmitter alternatively on at intervals which occur at a rate higher than audible frequency.

References Cited

UNITED STATES PATENTS

| | | | |
|---|---|---|---|
| 2,533,269 | 12/1950 | Lehmann | 325—8 |
| 2,706,244 | 4/1955 | Kuder | 325—6 |

OTHER REFERENCES

Schwartz: "Information Transmission, Modulation, and Noise"; 1959, TK 5101-58, pp. 166-172.

RODNEY D. BENNETT, Jr., Primary Examiner
CHARLES E. WANDS, Assistant Examiner

U.S. Cl. X.R.

325—8, 21